United States Patent [19]
Eckhoff

[11] 3,919,145
[45] Nov. 11, 1975

[54] CHEMISTRY AND PROCESS FOR A STAIN RESISTANT AQUEOUS HOUSE PAINT FREE OF HEAVY METALS

[76] Inventor: Paul S. Eckhoff, P.O. Box No. 805, Melville, L.I., N.Y. 11746

[22] Filed: July 23, 1973

[21] Appl. No.: 382,040

[52] U.S. Cl. 260/22 TN; 260/23 TN; 260/29.2 TN
[51] Int. Cl.² ................. C09D 3/72; C09D 5/02
[58] Field of Search ... 260/22 TN, 23 TN, 29.2 TN; 117/148

[56] References Cited
UNITED STATES PATENTS

| | | | |
|---|---|---|---|
| 3,234,039 | 2/1966 | Lalk et al. | 117/148 |
| 3,316,200 | 4/1967 | Hatala | 117/148 |
| 3,320,196 | 5/1967 | Rogers | 117/148 |
| 3,369,921 | 2/1968 | Stutz et al. | 117/151 |
| 3,377,198 | 4/1968 | Sander | 117/148 |
| 3,423,346 | 1/1969 | Klauss et al. | 260/22 TN |
| 3,592,580 | 7/1971 | Hoffmann | 117/151 |
| 3,691,117 | 9/1972 | Messerly | 117/148 |
| 3,756,850 | 9/1973 | Story | 117/148 |
| 3,756,975 | 9/1973 | Story | 117/148 |

*Primary Examiner*—Ronald W. Griffin

[57] ABSTRACT

Coating compositions suitable for use as house paints resistant to stains extractable from redwood, cedar and other wood substrates are prepared by a process characterized by the essential stages of (1) emulsifying under alkaline conditions a film-forming oxidatively curable oil or alkyd modified polyurethane, (2) blending therewith a copolymeric or homopolymeric vinyl acetate or acylic latex and (3) incorporating into the mixture aluminum chlorhydrate in the proportion of 10–20% by weight of the polyurethane polymer.

15 Claims, No Drawings

CHEMISTRY AND PROCESS FOR A STAIN RESISTANT AQUEOUS HOUSE PAINT FREE OF HEAVY METALS

EXAMPLES

Seven examples follow. Six of these examples have to do with the manufacture of the resin system. The seventh formulation is the paint.

EXAMPLE 1

The first example typifies the production of an intermediate for a high-solids exidatively curable alkyd-modified polyurethane resin dissolved in a hydrocarbon solvent. High solids are used for ease and efficiency in manufacture and to hold the quantity of solvent within limits specified in legislation controlling solvent emissions from applied coatings.

| | |
|---|---|
| Soybean oil | 1256 pounds |
| Litharge | 91 grams |
| Pentaerythritol, technical grade | 146 pounds |
| Phthalic anhydride | 214 pounds |
| Ethylene glycol | 56 pounds |
| Xylol | 334 pounds |
| Anti-foam solution* | ½ fl.oz. |

*A common anti-foam solution consists of a 2% solution of a silicone resin such as Dow-Corning Anti-foam A in a heavy aromatic solvent such as Solvesso 150.

In a suitable reactor, such as an alkyd reactor, heat the soybean oil while sparging with nitrogen at 5 cubic feet per minute (5 cfm). Add the pentaerythritol at 215°F and continue the upheat, gaining 408°F in 1 hour. At 408°F add the litharge slurried in a small amount of oil. Continue the upheat to 453°F, taking about 1 hour. At 453°F add the phthalic anhydride and the anti-foam solution. The elapsed time to this point is about 3 hours. Cool to 400°F and add the ethylene glycol. After all the ethylene glycol has been added, heat to 430°F and hold at 430°F for approximately 4 hours, at which time the acid number will be approximately 6 to 7. Cool the batch to 300°F and add the xylol to reduce the non-volatile content to 84%. Pass the solution through a filter press and pump to a steam-jacketed reactor for the next stage, typified by Example 3, which illustrates the reaction of the alkyd intermediate with toluene diisocyanate.

EXAMPLE 2

This example typifies the production of an intermediate for an oxidatively curable oil-modified polyurethane.

| | |
|---|---|
| Linseed oil | 1053 pounds |
| Litharge | 2.5 ounces |
| Glycerol | 162 pounds |
| Mineral spirits | 1200 pounds |

Heat linseed oil to 440°F under an inert gas blanket. Add litharge and then glycerol. Reheat to 440°F and hold for completion of the alcoholysis reaction, as indicated by solubility of a test portion in two volumes of methyl alcohol. Cool and add mineral spirits with stirring. Pass through a filter press and pump to a steam-jacketed reactor for use in the next stage, typified by Example 4, which illustrates the reaction of this type of intermediate with toluene diisocyanate.

EXAMPLE 3

Example 3 illustrates the conversion of the alkyd-modified intermediate of Example 1 into an alkyd-modified polyurethane.

| | |
|---|---|
| Intermediate as prepared in Example 1, at 84% solids | 6609 pounds |
| Xylol | 43.5 pounds |
| Methyl alcohol | 96.5 pounds |
| Toluene diisocyanate | 836 pounds |
| 1,10-phenanthroline (38% solution)* | 16.5 pounds |

*Commercially available as Activ-8

Charge intermediate and xylol to a steam-jacketed reactor fitted with a reflux condenser and agitator. Use slow speed agitation (about 40 rpm). Begin heating the mixture of intermediate and xylol while adding the toluene diisocyanate over a period of a half hour. Heat to 200°F and maintain the temperature at 200°F. Cook to an anticipated viscosity of 120 seconds in a standard 10.65 mm Gardner viscosity vial, which requires about 4 hours. Commence cooling at the anticipated end point and pump in 96.5 pounds of methyl alcohol below the liquid level with the condenser on. Cool to 120°F, add the phenanthroline solution and pump the mixture to storage.

The finished product has the following properties:

| | |
|---|---|
| Body | Z3–Z4 |
| Non-volatile content | 85% |
| Color (Gardner) | 5–7 |
| Acid value of non-volatile resin | 5 |
| Pounds per U.S. gallon | 8.35 |

EXAMPLE 4

Example 4 illustrates the conversion of the oil-modified intermediate of Example 2 into an oil-modified polyurethane.

| | |
|---|---|
| Oil-modified intermediate of Example 2 | 2415 pounds |
| Toluene diisocyanate | 435 pounds |

Heat the intermediate to 110°F in a reactor equipped with an agitator. To the stirred intermediate add the toluene diisocyanate at the rate of 0.15 gallons per minute. After 4 gallons have been added, increase the flow rate to 0.4 gallons per minute. When all toluene diisocyanate has been added, hold at 110° for 1 hour, then allow to cool.

The final product has the following properties:

| | |
|---|---|
| Body | Z–Z1 |
| Non-volatile content | 60.3% |
| Color (Gardner) | 6–7 |
| Acid value of non-volatile resin | 0.38 |

EXAMPLE 5

This example illustrates the preparation of a 1000-gallon batch of the alkaline emulsion of polyurethane and latex.

| | |
|---|---|
| Polyurethane resin at 85% solids, from | 1335 pounds |

-continued

| Example 3 | |
|---|---|
| Ammonium hydroxide, concentrated | 40 pounds |
| Polyoxyethylated nonylphenol containing 65% ethylene oxide | 172 pounds |
| Water | 832 pounds |
| Vinyl acetate-di-2-ethylhexyl maleate copolymer latex at 55% solids or vinyl-acrylic latex at 55% solids | 6561 pounds |

Heat the polyurethane resin solution to approximately 85°F in a high-shear mixing vessel. Add the ammonia slowly, with agitation. After the ammonia is well incorporated as indicated by the homogeneity of the mixture, add the Igepal CO-630, then the water. Finally, add the vinyl emulsion gradually and observe the inversion from a "water-in-oil" state to the "oil-in-water" state. If the inversion is properly executed, a small particle size emulsion results, generally below 3 micron average particle size. After inversion, continue agitation for at least 10 minutes. Filter and pump to storage.

The finished emulsion has the following properties:

| Viscosity | 54–60 Krebs units |
|---|---|
| Non-volatile content | 55% |
| pH | 8.5 – 9.5 |
| Pounds per U.S. gallon | 8.8 |

EXAMPLE 6

Example 6 illustrates the preparation of the non-film-forming composition containing the tannin precipitant.

| Aluminum chlorohydrate, 50% aqueous solution | 140 pounds |
|---|---|
| Polyoxyethylated nonylphenol containing 23% ethylene oxide | 10 pounds |
| Colloids 677* | 8 pounds |
| Polyethylene glycol P-1200 | 16 pounds |
| Polyoxyethylated nonylphenol containing 65% ethylene oxide | 20 pounds |
| Water | 106 pounds |

*Product of Colloids, Inc.

In a vessel equipped with low speed turbine agitation add the materials in the order shown. Pump to storage.

EXAMPLE 7

Using a disc type disperser, add in the order shown:

| Water | 200 lb. |
|---|---|
| Methocel | 1.5 lb. |
| Aluminum chlorohydrate dispersion of Example 6 | 81.5 lb. |
| Water dispersible lecithin | 6 lb. |
| Ammonia, concentrated | 7 lb. |

Increase the agitator speed and add the following in the order shown:

| Titanium dioxide | 144 lb. |
|---|---|
| Alkaline polyurethane-latex emulsion of Example 5 | 44 lb. |
| Talc or calcium carbonate | 125 lb. |
| Zinc oxide | 50 lb. |
| 1-(3-chloroallyl)-3,5,7-triaza-1-azonia adamantane chloride | 1 lb. |

Hold for 10 minutes with agitation before adding:

| Ethylene glycol | 28 lb. |
|---|---|
| Water | 1 gallon |
| Potassium tripolyphosphate | 7 lb. |
| Polyoxyethylated nonylphenol containing 65% ethylene oxide | 5 lb. |
| 2,2,4-trimethylpentane-1,3-diol monoisobutyrate | 7 lb. |
| Colloids 581B* | 1 lb. |

Reduce agitator speed while adding the following:

| Alkaline polyurethane-latex emulsion of Example 5 | 45 gallons |
|---|---|

*Product of Colloids, Inc.

The product paint has the following typical properties:

| Non-volatile content | 55% |
|---|---|
| Pigment volume concentration | 31.8% |
| Pounds per U.S. gallon | 10.95 |

What I claim is:

1. A composition for the painting or repainting of staining woods, said composition containing an aqueous resin binder formed by blending (1) an aqueous alkaline emulsion of a polyurethane resin based on a drying oil and (2) an aqueous dispersion of a film-forming interpolymer useful as a paint vehicle, said composition being further characterized by the incorporation of aluminum chlorhydrate into said mixed resin binder.

2. The composition of claim 1 wherein the oil-based polyurethane resin comprises 10–20% of the total resinous binder.

3. The composition of claim 2 wherein the oil-based polyurethane is a reaction product of toluene diisocyanate with the alcoholysis product of a drying oil and an polyhydric alcohol.

4. The composition of claim 3 in which the drying oil is selected from the group consisting of linseed, safflower, walnut and soybean oil.

5. The composition of claim 2 wherein the oil-based polyurethane is a reaction product of toluene diisocyanate and a hydroxyl group-containing alkyd resin containing an oxidatively drying oil selected from the group consisting of linseed, safflower, walnut and soybean oils.

6. The composition of claim 1 wherein the film-forming interpolymer is a homopolymeric or copolymeric vinyl acetate latex.

7. The composition of claim 6 wherein the film-forming interpolymer is the copolymer of vinyl acetate with one or more copolymerizable monomers chosen from the group consisting of butyl acrylate, isobutyl acrylate, 2-ethylhexyl acrylate, dibutyl maleate, di-isobutyl maleate, di-2-ethylhexyl maleate, dibutyl fumarate, diisobutyl fumarate, di-2-ethylhexyl fumarate, vinyl ester of versatic acid, and ethylene.

8. The composition of claim 1 wherein the film-forming interpolymer is a 100%-acrylic latex.

9. The composition of claim 1 wherein the polyurethane resin is dissolved in a maximum of 25% its weight of hydrocarbon solvent.

10. The composition of claim 9 wherein the hydrocarbon solvent is selected from the group consisting of xylene and mineral spirits.

11. A composition of claim 9 wherein the aluminum chlorhydrate is incorporated as a composition formed by blending with surface active agents, a glycol and a defoaming agent.

12. The composition of claim 1 wherein the aluminum chlorohydrate comprises 8–10% of the total vehicle solids.

13. A composition of claim 1 in which the pH of the finished paint is maintained between 9.5 and 10.5.

14. A composition for painting wood surfaces containing an aluminum chlorhydrate compound, in an amount up to 10% of the total vehicle solids, and an alkaline emulsion of a polyurethane resin or solution of a polyurethane resin.

15. The process of preparing a bleed resistant paint containing the essential steps of (1) blending an alkaline emulsion of a polyurethane resin or solution thereof in a hydrocarbon solvent with an aqueous dispersion of a filogenic interpolymer suitable as a paint vehicle and (2) incorporating into said blend a composition containing aluminum chlorhydrate in an amount up to 10% of total vehicle solids, surface active agents and defoamers dispersed in a medium consisting of ethylene glycol or propylene glycol.

* * * * *